(12) United States Patent
Choi et al.

(10) Patent No.: US 11,386,018 B2
(45) Date of Patent: Jul. 12, 2022

(54) MEMORY SYSTEM AND OPERATING METHOD THEREOF

(71) Applicant: SK hynix Inc., Gyeonggi-do (KR)

(72) Inventors: Han Choi, Gyeonggi-do (KR); Jae Wan Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/151,993

(22) Filed: Jan. 19, 2021

(65) Prior Publication Data

US 2022/0012185 A1 Jan. 13, 2022

(30) Foreign Application Priority Data

Jul. 13, 2020 (KR) .................. 10-2020-0085857

(51) Int. Cl.
*G06F 12/14* (2006.01)
*G06F 13/16* (2006.01)
*G06F 12/0882* (2016.01)
*G06F 12/02* (2006.01)

(52) U.S. Cl.
CPC ...... *G06F 12/1408* (2013.01); *G06F 12/0246* (2013.01); *G06F 12/0882* (2013.01); *G06F 12/1441* (2013.01); *G06F 13/1668* (2013.01)

(58) Field of Classification Search
CPC .. G06F 12/00; G06F 12/1408; G06F 12/0246; G06F 12/0882; G06F 12/1441; G06F 13/00; G06F 13/1668
See application file for complete search history.

(56) References Cited

U.S. PATENT DOCUMENTS

| | | | |
|---|---|---|---|
| 2007/0028118 A1* | 2/2007 | Brown | G06Q 20/4012 713/185 |
| 2014/0281587 A1* | 9/2014 | Ignatchenko | G06F 21/64 713/193 |
| 2020/0133887 A1* | 4/2020 | Avanindra | G06F 21/606 |
| 2021/0334016 A1* | 10/2021 | Jean | G06F 21/602 |

FOREIGN PATENT DOCUMENTS

| | | |
|---|---|---|
| KR | 10-2015-0101683 | 9/2015 |
| KR | 10-2015-0114363 | 10/2015 |

\* cited by examiner

*Primary Examiner* — Tuan V Thai
(74) *Attorney, Agent, or Firm* — IP & T Group LLP

(57) ABSTRACT

Embodiments of the present disclosure relate to a memory system and an operating method thereof. According to the embodiments of the present disclosure, the memory system may generate a nonce based on a physical address of a target area of a memory device using a cryptographic algorithm, and request the memory device to authenticate the nonce. When the authentication for the nonce succeeds, the memory controller may set an authority to perform a read, write or erase operation on the target area. Through this operation, the memory system can prevent data leakage or damage by a user who has no access authority.

18 Claims, 17 Drawing Sheets

MEMORY SYSTEM AND OPERATING METHOD THEREOF

CROSS-REFERENCE TO RELATED APPLICATION

The present application claims priority to Korean Patent Application No. 10-2020-0085857, filed in the Korean Intellectual Property Office on Jul. 13, 2020, which is incorporated herein by reference in its entirety.

BACKGROUND

1. Technical Field

Various embodiments generally relate to a memory system and an operating method thereof.

2. Related Art

A memory system, e.g., a storage device, stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute or control operations for reading, writing, or erasing data in a volatile memory or a nonvolatile memory included in the memory system. The memory controller may drive firmware for performing a logical operation for controlling such operations.

The data stored in the memory device are likely to be leaked or damaged by various types of attacks from external attackers. In general, the memory system prevents the leakage of, or damage to, data using FDE (Full Disk Encryption). However, when a signal is directly inputted to the memory device even though the memory system uses FDE, the memory system cannot block data leakage or damage.

SUMMARY

Various embodiments are directed to a memory system capable of preventing data leakage or damage by a user who has no access authority.

In one aspect, embodiments of the disclosure may provide a memory system including: a memory device including a plurality of memory dies, each including a plurality of memory blocks, each including a plurality of pages having data stored therein; and a memory controller suitable for communicating with the memory device and executing firmware to control the memory device.

The memory controller may generate a nonce based on a physical address of a target area of the memory device, using a cryptographic algorithm, and request the memory device to authenticate the nonce.

The memory device may set an authority for the memory controller to perform a read, write or erase operation on the target area, when the authentication for the nonce succeeds.

The target area may be a page, memory block or memory die.

The cryptographic algorithm may be one of HMAC, SHA, AES and RSA.

The memory device may reset the authority for the memory controller to perform a read, write or erase operation on the target area when i) a power off/on occurs or ii) a command for a request for resetting the authority to perform a read, write or erase operation on the target area is received from the memory controller.

The memory device may authenticate the nonce by comparing a result value, which is generated by decrypting the nonce using the cryptographic algorithm, to the physical address of the target area. At this time, the memory controller may transmit a decrypt key for decrypting the nonce to the memory device, before the authentication for the nonce is performed.

For another example, the memory device may authenticate the nonce by comparing the nonce to a reference nonce for the target area. At this time, the reference nonce may be stored in the target area when transmitting a command for a request for resetting the authority for the memory controller.

The memory device may transmit a result of the authentication to the memory controller after a set delay time.

In another aspect, embodiments of the disclosure may provide an operating method of a memory system which includes a memory device including a plurality of memory dies, each including a plurality of memory blocks, each including a plurality of pages having data stored therein; and a memory controller suitable for communicating with the memory device and executing firmware to control the memory device.

The operating method may include generating, by the memory controller, a nonce based on a physical address of a target area of the memory device, using a cryptographic algorithm.

The operating method may include requesting, by the memory controller, authentication for the nonce.

The operating method may include authenticating the nonce by the memory device.

The operating method may include setting, by the memory device, an authority for the memory controller to perform a read, write or erase operation on the target area, when the authentication for the nonce succeeds.

The target area may be a page, memory block or memory die.

The cryptographic algorithm may be one of HMAC, SHA, AES and RSA.

The operating method may include resetting, by the memory device, the authority to perform a read, write or erase operation on the target area when i) a power off/on occurs or ii) the memory controller transmits, to the memory device, a command for a request for resetting the authority to perform a read, write or erase operation on the target area.

The nonce may be authenticated by comparing a result value, which is generated by decrypting the nonce using the cryptographic algorithm, to the physical address of the target area. At this time, a decrypt key for decrypting the nonce may be transmitted to the memory device before the authentication is performed.

The nonce may be authenticated by comparing the nonce to a reference nonce for the target area. At this time, the reference nonce may be stored in the target area when transmitting a command for a request for resetting the authority for the memory controller.

The operating method may include transmitting, by the memory device, a result of the authenticating to the memory controller after a set delay time.

In another aspect, embodiments of the disclosure may provide a memory system including: a memory device; and a controller suitable for encrypting an original physical address according to a cryptographic scheme to generate a first hash and providing the original physical address and the first hash to the memory device.

The memory device may authenticate the physical address through the first hash to allow an access to a storage location indicated by the provided physical address.

The memory device may authenticate the provided physical address by encrypting the physical address according to the cryptographic scheme to generate a second hash and comparing the first and second hashes.

The memory device may authenticate the physical address by decrypting the first hash according to the cryptographic scheme to retrieve a physical address and comparing the provided physical address and the retrieved physical address.

The controller may provide the first hash to the memory device as a reference hash and the memory device may authenticated the provided physical address by comparing the first hash and the reference hash.

According to the embodiments of the disclosure, it is possible to prevent data leakage or damage by a user who has no access authority.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). Also, the term "embodiments" when used herein does not necessarily refer to all embodiments.

Figure 1:
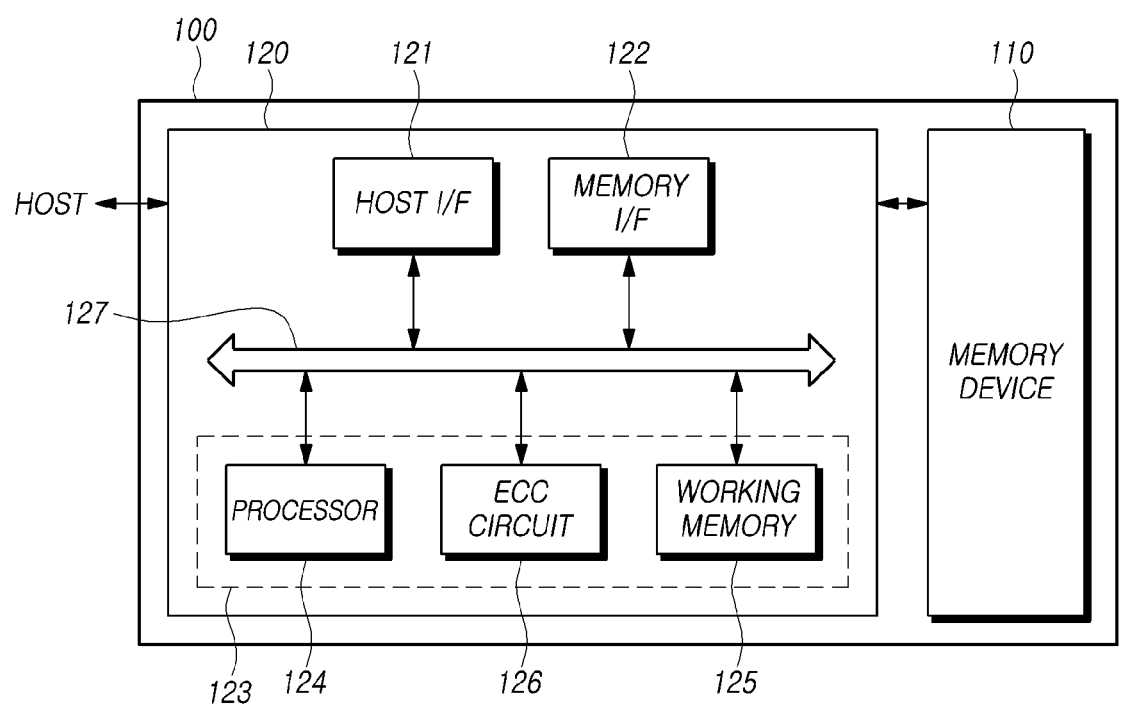
FIG. 1 is a schematic diagram illustrating a configuration of a memory system according to an embodiment of the present disclosure.

FIG. 1 is a diagram illustrating the schematic configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells") configured to store data. The memory cell array may exist inside a memory block.

For example, the memory device 110 may be implemented as any of various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array selected using the address. That is, the memory device 110 may perform an operation corresponding to the received command in a memory area of the memory device having a physical address corresponding to the received address from the memory controller 120.

For example, the memory device 110 may perform a program operation, a read operation, an erasure operation, and the like. During the program operation, the memory device 110 may program data in the area selected by the address. During the read operation, the memory device 110 may read data from the area selected by the address. During the erasure operation, the memory device 110 may erase data stored in the area selected by the address.

The memory controller 120 may control write (program), read, erasure, and background operations with regard to the memory device 110. The background operation may include, for example, a garbage collection operation (GC), a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In another embodiment, the memory controller 120 and the host may be integrated and implemented as a single device. In the following description, the memory controller 120 and the host are separate devices.

Referring to FIG. 1, the memory controller 120 may include a memory interface 122, a control circuit 123, and a host interface 121.

The host interface 121 may be configured to provide an interface for communication with the host (HOST).

When receiving a command from the host, the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations to exercise overall control of the memory controller 120. For example, the control circuit 123 may include a processor 124 and a working memory 125. The control circuit 123 may further include an error detection/correction circuit (ECC circuit) 126 and the like.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. In other words, the processor 124 may control overall operation of the memory controller 120 and, in order to perform a logical operation, may execute (drive) firmware loaded into the working memory 125 during booting.

The firmware refers to a program executed inside the memory system 100, and may include various functional layers.

For example, the firmware may include a flash translation layer (FTL) configured to translate between a logical address that the host requests the memory system 100 to provide and a physical address of the memory device 110, a host interface layer (HIL) configured to interpret a command that the host HOST issues to the memory system 100 (storage device) and to deliver the same to the FTL, and/or a flash interface layer (FIL) configured to deliver a command issued by the FTL to the memory device 110.

For example, the firmware may be stored in the memory device 110, then loaded into the working memory 125.

The working memory 125 may store firmware, program codes, commands, or pieces of data to drive the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect error bit(s) of target data by using an error correction code, and to correct the detected error bit(s). For example, the target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect error bit(s), sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than or equals to the reference value, the error detection/correction circuit 126 may determine that the corresponding sector is correctable or "a pass".

The error detection/correction circuit 126 may perform error detection and correction operations successively with regard to all pieces of read data. When a sector included in the read data is correctable, the error detection/correction circuit 126 may omit the error detection and correction operations related to the corresponding sector of the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are only provided as examples. It is noted that one or more of these elements may be omitted from the memory controller 120, and/or one or more of such elements may be integrated into a single element. Of course, the memory controller 120 may contain more elements than those shown in FIG. 1.

Hereinafter, the memory device 110 is described in more detail with reference to FIG. 2.

Figure 2:
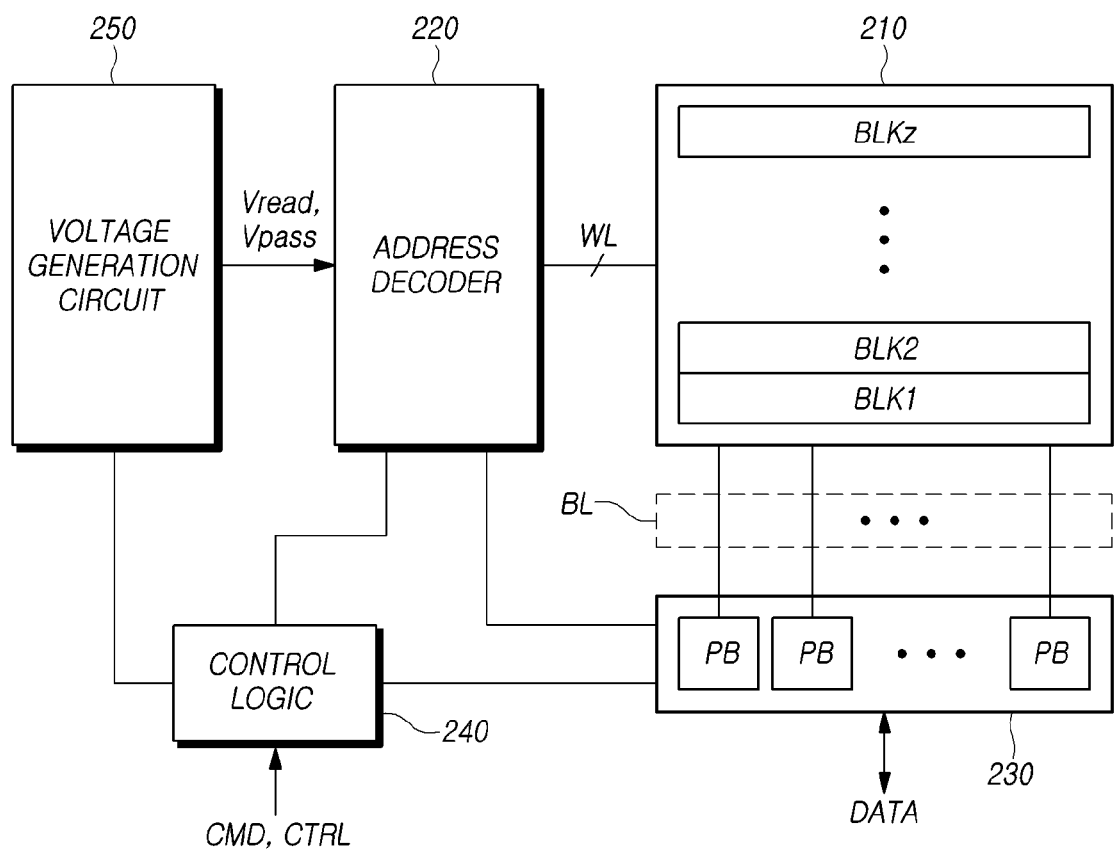
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 according to an embodiment of the present disclosure may include a memory cell array 210, an address decoder 220, a read/write circuit 230, control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, which may have a vertical channel structure.

The memory cell array 210 may be configured as a memory cell array having a two-dimensional structure and, in some cases, may be configured as a memory cell array having a three-dimensional structure.

Each of the multiple memory cells included in the memory cell array 210 may store at least one bit of data. For example, each of the multiple memory cells included in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells, each of which may be configured to store five or more bits of data.

Referring to FIG. 2, the address decoder 220, the read/write circuit 230, the control logic 240, and the voltage generation circuit 250 may collectively operate as a peripheral circuit configured to drive the memory cell array 210.

The address decoder 220 may be connected to the memory cell array 210 through the multiple word lines WL.

The address decoder 220 may be configured to operate in response to control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

The address decoder 220 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some cases, may further include a cache buffer that operates in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may consist of multiple pages PG and multiple strings. The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The intersections of the multiple word lines WL and the multiple bit lines BL define multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
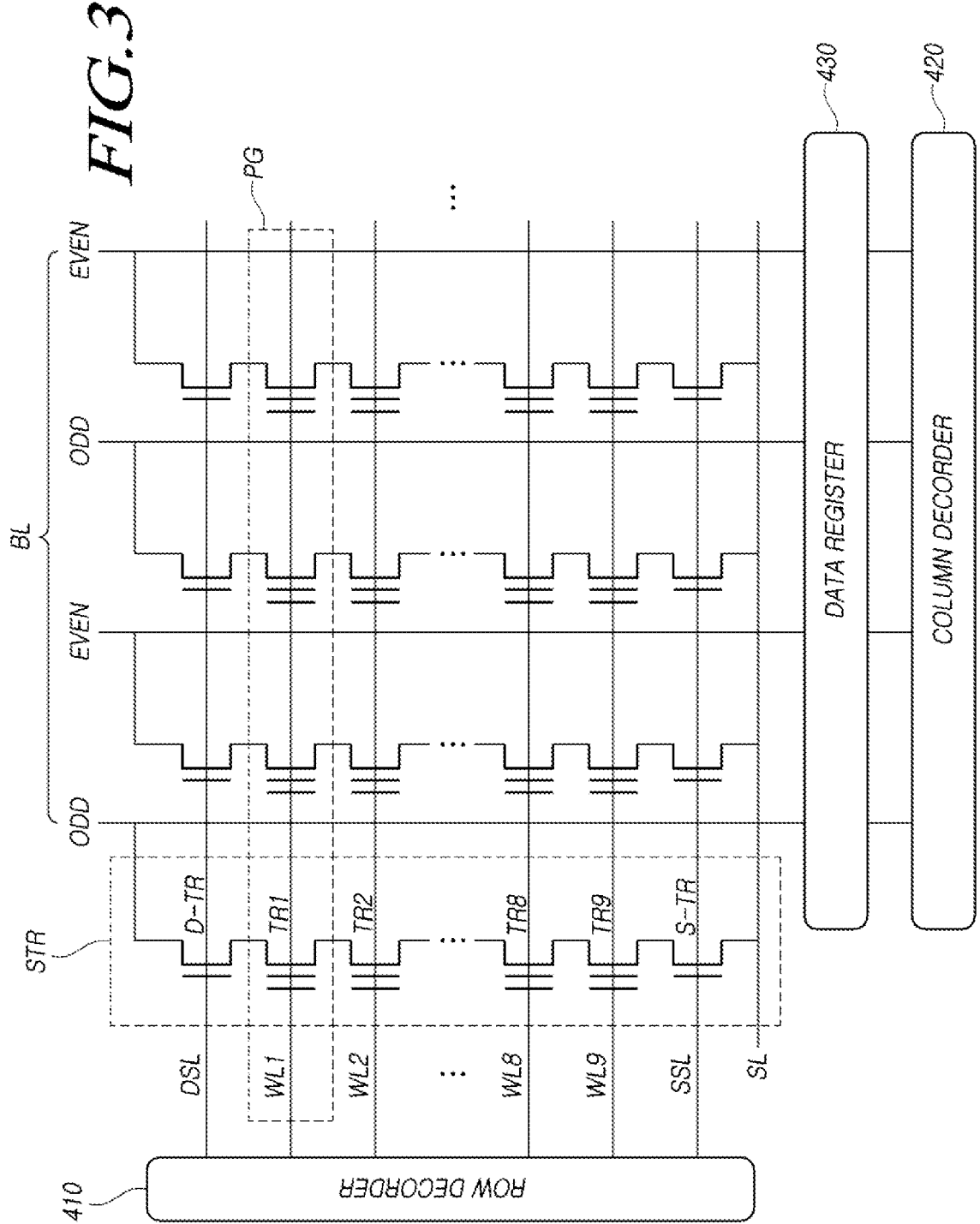
FIG. 3 is a diagram illustrating a structure of word lines and bit lines of a memory device according to an embodiment of the present disclosure.

FIG. 3 is a diagram illustrating a structure of word lines WL and bit lines BL of a memory device 110 according to an embodiment of the present disclosure.

Referring to FIG. 3, the memory device 110 has a core area in which memory cells MC are concentrated, and an auxiliary area which corresponds to the remaining, non-core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320, alternating between odd-numbered bit lines BL and even-numbered bit lines BL.

For accessing a memory cell MC, the address may be entered to the core area first through the input/output end and then through the row decoder 310 and the column decoder 320 such that a corresponding target memory cell is designated. As used herein, designating a target memory cell refers to accessing one of the memory cells MC at a site of intersection between one of the word lines WL1-WL9 connected to the row decoder 310 and one of the bit lines BL connected to the column decoder 320, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC downstream or down line among memory cells MC connected in series may slightly differ from the voltage applied to an upstream memory cell MC, due to the voltage drop across the preceding memory cell(s) MC.

The data register 330 plays an important role because all data processing by the memory device 110, including program and read operations, occurs via the data register 330. If data processing by the data register 330 is delayed, all of the other areas need to wait until the data register 330 finishes the data processing. In addition, degradation of performance of the data register 330 may degrade overall performance of the memory device 110.

Referring to the example illustrated in FIG. 3, in one string STR, multiple transistors TR1-TR9 may be connected to multiple word lines WL1-WL9. The multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 in terms of the signal path among the two outermost word lines WL1 and WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 330. The second selection transistor S-TR plays the role of a switch that turns on or off the connection between the corresponding string STR and the source line SL. That is, the first selection transistor D-TR and the second selection transistor S-TR play the role of gatekeepers which are positioned on opposite ends of the corresponding string STR and deliver/block signals.

During a program operation, the memory system 100 fills the target memory cell MC of the bit line BL which is to be programmed with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may supply a voltage (for example, +20V) to the substrate through a source line SL during an erasure operation. The memory system 100 floats both the first selection transistor D-TR and the second selection transistor S-TR during an erasure operation, thereby generating an infinite resistance. As a result, the role or effect of the first selection transistor D-TR and that of the second selection transistor S-TR may be removed, and electrons may operate only between the floating gate FG and the substrate due to the potential difference.

Figure 4:
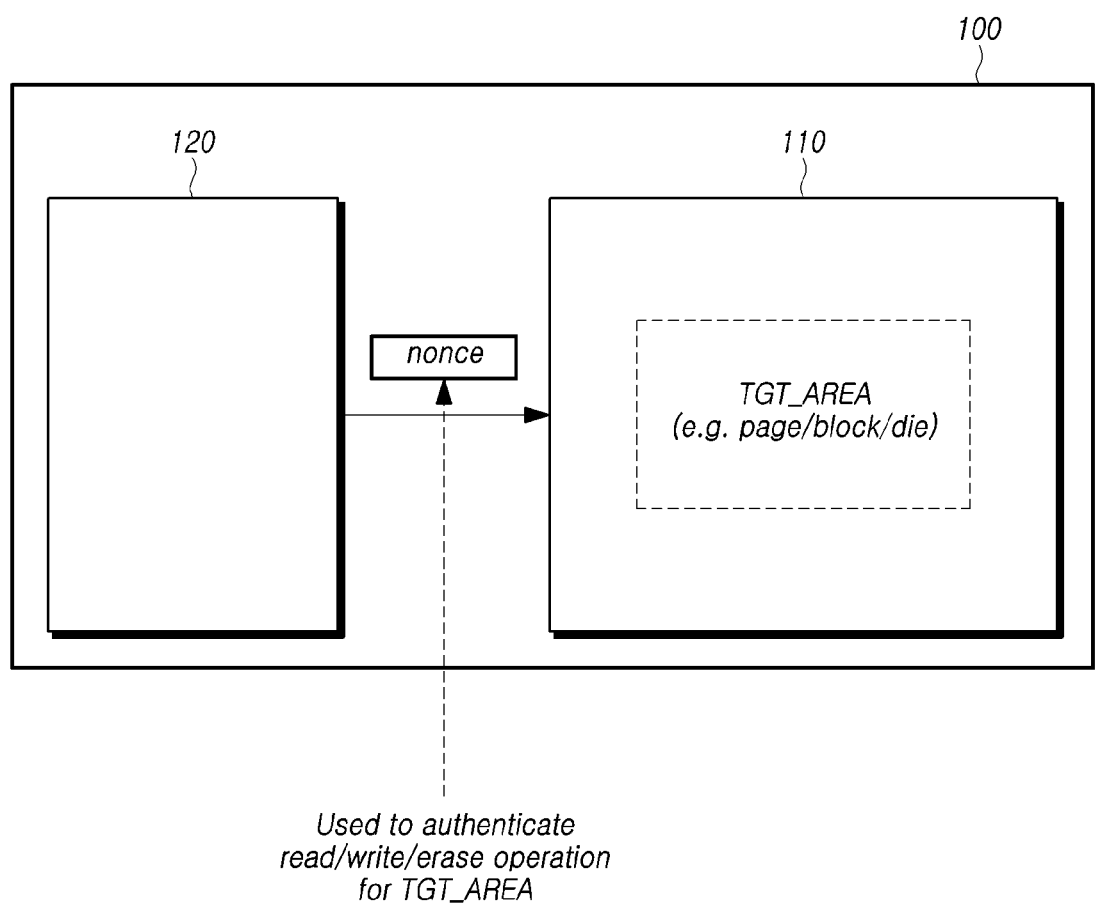
FIG. 4 is a diagram illustrating an operation in which a memory controller, according to an embodiment of the present disclosure, requests authentication for a nonce.

FIG. 4 is a diagram illustrating an operation in which the memory controller 120 requests authentication for a nonce, according to an embodiment of the present disclosure.

Referring to FIG. 4, the memory controller 120 may generate a nonce, and request the memory device 110 to authenticate the generated nonce.

The nonce is a temporary value used once for cryptographic communication. The memory controller 120 may request the memory device 110 to authenticate the nonce to access the memory device 110.

The memory controller 120 may transmit a separate authentication request for the nonce, for example, to request the memory device 110 to authenticate the nonce. For another example, the memory controller 120 may include a nonce in a read, write or erase command, and transmit the read, write or erase command to request authentication for the nonce.

In an embodiment, the memory controller 120 may transmit a nonce to the memory device 110 to acquire authority to perform a read, write or erase operation on a target area TGT_AREA of the memory device 110. That is, the memory controller 120 may acquire authority to perform a read, write or erase operation for each target area TGT_AREA of the memory device 110, instead of acquiring authority to perform a read, write or erase operation on the entire area of the memory device 110. That is, authority is acquired on a target area basis.

The memory device 110 may include a plurality of pages in which data are stored, a plurality of memory blocks each including the pages, and a plurality of memory dies each including the memory blocks. The target area TGT_AREA may be a page, memory block or memory die, for example.

Figure 5:
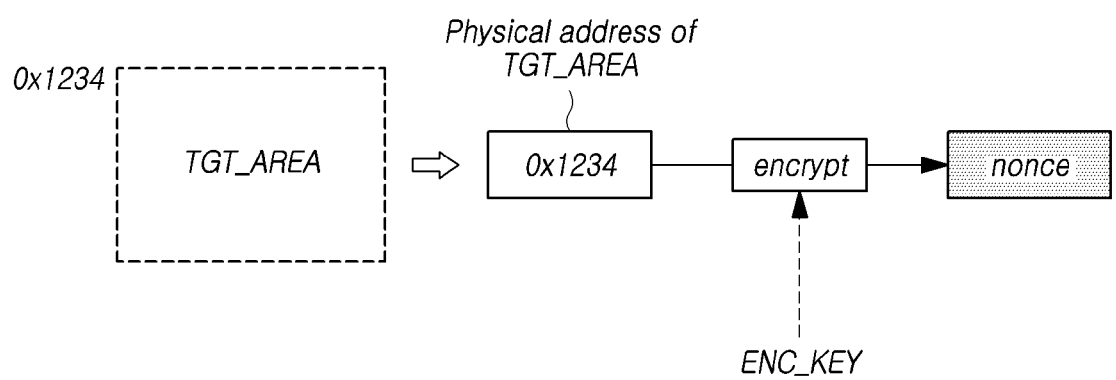
FIG. 5 is a diagram illustrating an operation in which the memory controller, according to an embodiment of the present disclosure, generates a nonce.

FIG. 5 is a diagram illustrating an operation in which the memory controller 120, according to an embodiment of the present disclosure, generates a nonce.

The memory controller 120 may generate a nonce based on the physical address of the above-described target area TGT_AREA, using a cryptographic algorithm. For example, the memory controller 120 may encrypt the physical address of the target area TGT_AREA according to the cryptographic algorithm in order to generate the nonce.

FIG. 5 is based on the supposition that the physical address of the target area TGT_AREA has a value of 0x1234. For example, the memory controller 120 may use an encrypt key ENC_KEY in order to encrypt the value 0x1234 of the physical address according to the cryptographic algorithm.

For example, the encrypt key ENC_KEY may be a random or pseudo-random value which is generated when the memory system 100 is reset.

For another example, the encrypt key ENC_KEY may be a unique value for each memory system as the Root of Trust (RoT) of the memory system 100. The RoT may be stored in a separate area outside the memory device 110.

Examples of the cryptographic algorithm used to generate a nonce include HMAC, SHA, AES and RSA. A different cryptographic algorithm may be used for each memory system.

The memory system 100 may execute the corresponding cryptographic algorithm in software through firmware driven by the memory controller 120, or execute the corresponding cryptographic algorithm through a circuit capable of executing the cryptographic algorithm.

Hereafter, a process of generating and authenticating a nonce using the HMAC among the above-described examples of the cryptographic algorithms is described with reference to FIG. 6.

Figure 6:
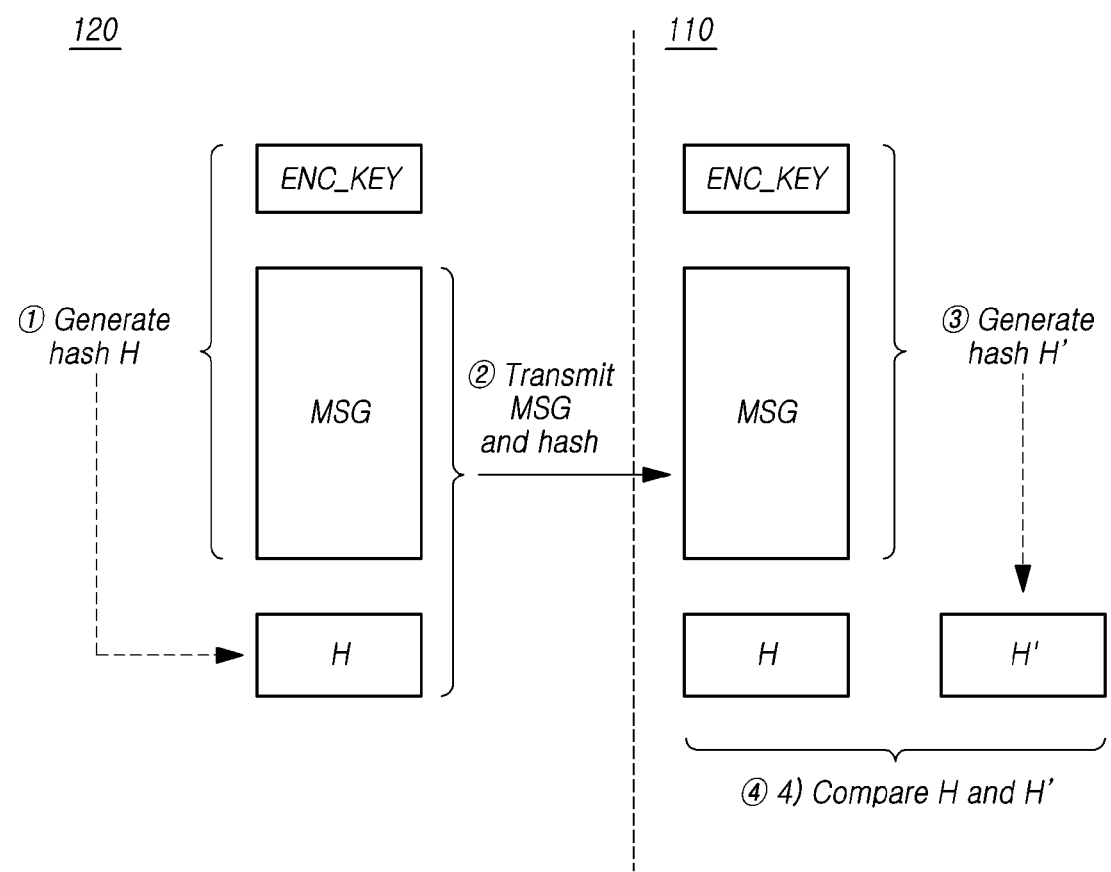
FIG. 6 is a diagram for describing an example of an HMAC algorithm used to generate a nonce.

FIG. 6 is a diagram for describing an example of the HMAC algorithm used to generate a nonce.

Referring to FIG. 6, the memory controller 120 may generate a hash H for a message MSG using an encrypt key ENC_KEY. The message MSG may be a physical address value of the target area TGT_AREA. The hash H for the message MSG may be a nonce.

The memory controller 120 may transmit the message MSG and the hash H to the memory device 110.

The memory device 110 may generate a hash H' for the message MSG received from the memory controller 120, using the same encrypt key ENC_KEY.

The memory device 110 may compare the hash H received from the memory controller 120 to the newly generated hash H'. When the hash H and the hash H' are equal to each other, the memory device 110 may determine that the authentication for the nonce succeeded. On the other hand, when the hash H and the hash H' are different from each other, the memory device 110 may determine that the authentication for the nonce failed.

In an embodiment, the cryptographic algorithm used to generate a nonce may be the HMAC. This is because the HMAC uses a smaller number of logic gates to execute the cryptographic algorithm than other cryptographic algorithms such as AES and RSA. As the number of logic gates included in the memory device 110 to execute the cryptographic algorithm increases, the size of the memory device 110 may increase. In this case, the power consumption of the memory device 110 may increase, or the memory device 110 cannot be implemented within predefined standards.

Figure 7:
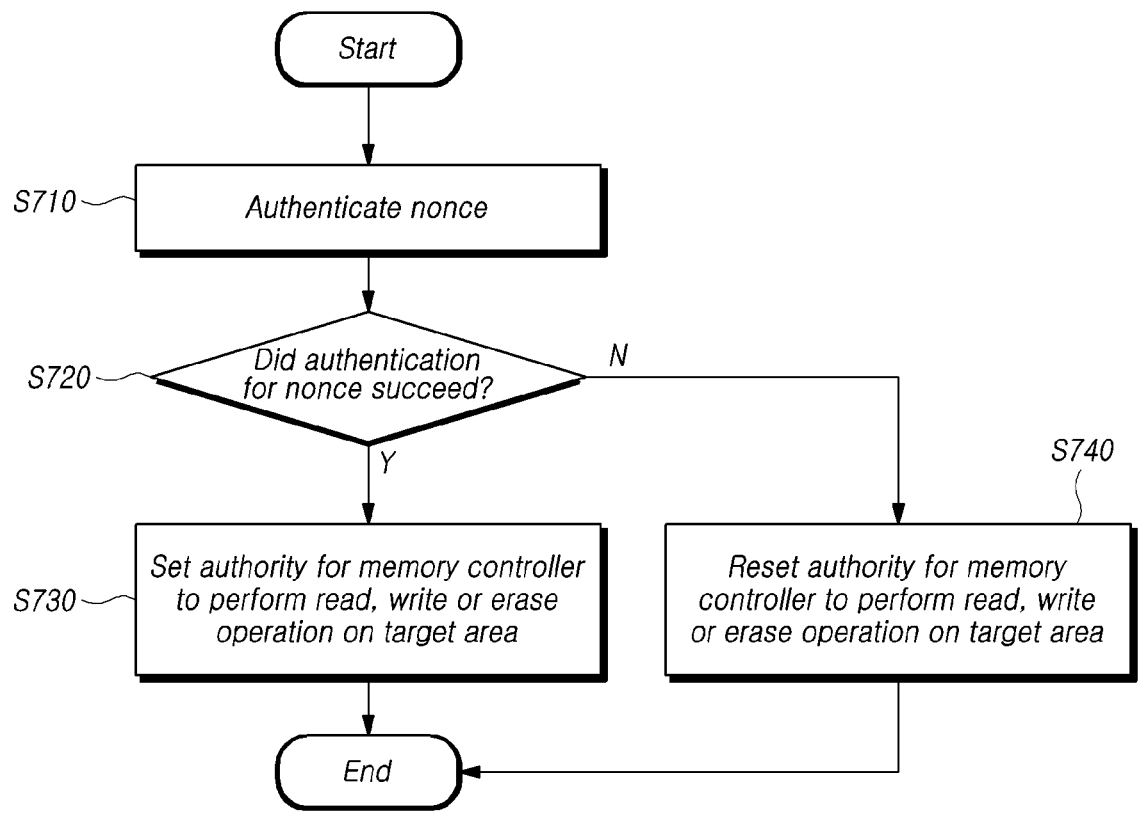
FIG. 7 is a flowchart illustrating an example of an operation in which a memory device, according to an embodiment of the present disclosure, authenticates a nonce.

FIG. 7 is a flowchart illustrating an example of an operation in which the memory device 110, according to an embodiment of the present disclosure, authenticates a nonce.

Referring to FIG. 7, the memory device 110 may authenticate the nonce, which may be received together with the physical address of the target area TGT_AREA, from the memory controller 120 in operation S710.

The memory device 110 may determine whether the authentication for the nonce has succeeded in operation S720. For example, the determination may be made through the HMAC algorithm as described with reference to FIG. 6.

When the authentication for the nonce has succeeded (Y in operation S720), the memory device 110 may set an authority for the memory controller 120 to perform a read, write or erase operation on the target area in operation S730. The memory device 110 may receive a command for requesting a read, write or erase operation on the target area from the memory controller 120, and perform a read, write or erase operation on the target area according to the received command.

On the other hand, when the authentication for the nonce has failed (N in operation S720), the memory device 110 may reset the authority for the memory controller 120 to perform a read, write or erase operation on the target area, in operation S740. If the memory device 110 receives a command for requesting a read, write or erase operation on the target area from the memory controller 120 during this time, the memory device 110 does not process the corresponding command.

By managing the authority to perform a read, write or erase operation on the target area using the nonce, the memory system 100 can prevent an unauthorized access from performing a read, write or erase operation on the target area, thereby enhancing the security of the memory device 110.

For example, when the memory system 100 does not use the above-described FDE, the memory system 100 may prevent an operation of writing/erasing data to/from the memory device 110 or reading data from the memory device 110, in the case that the authentication using a nonce is not performed, which makes it possible to protect the data stored in the memory device 110.

Even when the memory system 100 uses the above-described FDE, the memory system 100 can enhance the security of the memory device 110 through the authentication using a nonce.

For example, the FDE may include a method of encrypting data, storing the encrypted data in an SRAM/DRAM, and then storing the data in the memory device 110. However, this method has a disadvantage in that it is difficult to protect system data (e.g., meta data) generated in the memory system 100. Even in this case, the memory system 100 may also protect a read/write/erase operation of system data through the authentication using a nonce.

In an embodiment, the nonce generated for a single authentication is not applied to the entire area of the memory device 110, only to the target area indicated by the physical address that is encrypted to become the nonce. Therefore, according to the unit (e.g., page/memory block/memory die) of the target area, a large number of nonces may be used for the memory controller 120 to access the memory device 110. Furthermore, while a write operation requested by the host or a background operation (e.g., garbage collection or read reclaim) is performed, the physical address value of an area in which valid data is stored is continuously changed. Therefore, the value of a nonce used to perform a read/write/erase operation on data is continuously changed. Since a large number of nonces are used and the nonces are continuously changed over time, the memory system 100 may enhance the security of the memory device 110.

Hereafter, an operation of managing authority for the memory device 110 to perform a read, write or erase operation on the target area is described in detail with reference to the state diagram of the memory device 110 in FIG. 8.

Figure 8:
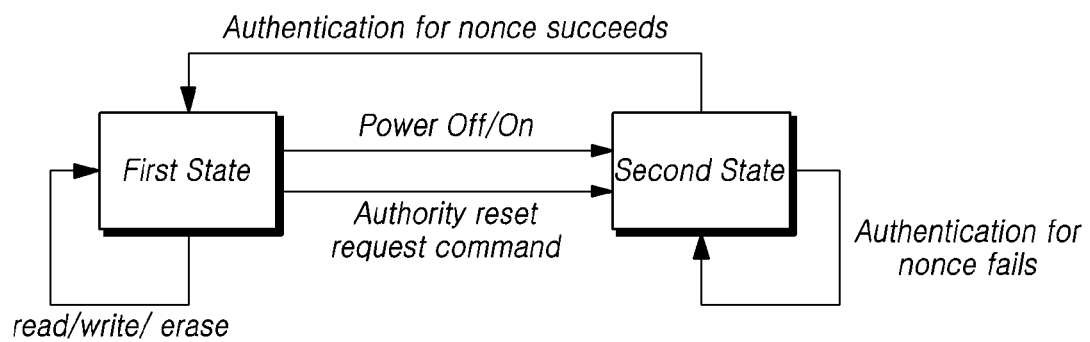
FIG. 8 is a diagram illustrating an example of a state diagram of the memory device according to an embodiment of the present disclosure.

FIG. 8 illustrates a state diagram of the memory device 110 according to an embodiment of the present disclosure.

Referring to FIG. 8, the memory device 110 may be in a first state in which i) an authority for the memory controller 120 to perform a read, write or erase operation on the target area TGT_AREA is set, or a second state in which ii) the authority for the memory controller 120 to perform a read, write or erase operation on the target area TGT_AREA is reset.

When the memory device 110 is in the first state, the memory device 110 may process a read, write or erase request for the target area, received from the memory controller 120. Even after the request is completely processed, the memory device 110 remains in the first state for that target area.

When the memory device 110 is in the first state, the memory device 110 may transition to the second state when i) a power off/on occurs or ii) a command for a request for resetting the authority to perform a read, write or erase operation on the target area TGT_AREA is received from the memory controller 120.

When the memory device 110 is in the second state, the memory device 110 may transition to the first state when the authentication for the nonce received from the memory controller 120 succeeds.

When the memory device 110 is in the second state, the memory device 110 may remain in the second state in the case where the authentication for the nonce received from the memory controller 120 fails.

Hereafter, a method in which the memory device 110 authenticates a nonce is described. First, an embodiment in which the memory device 110 can decrypt a nonce using a cryptographic algorithm is described.

Figure 9:
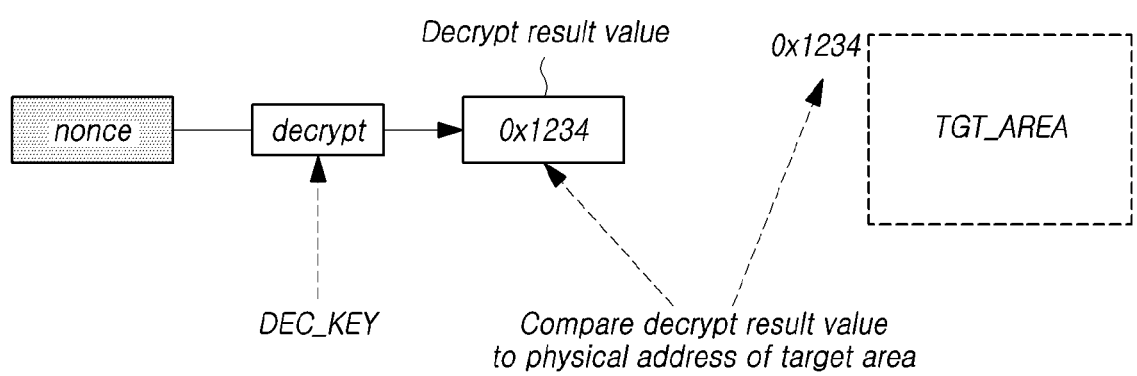
FIG. 9 is a diagram illustrating an example of a method in which a memory device according to an embodiment of the present disclosure, authenticates a nonce.

FIG. 9 is a diagram illustrating an example of a method in which the memory device 110, according to an embodiment of the present disclosure, authenticates a nonce.

Referring to FIG. 9, the memory device 110 may authenticate a nonce received from the memory controller 120 by comparing the result value, which may be generated by decrypting the nonce using the cryptographic algorithm, with the physical address of the target area TGT_AREA, which may be provided together with the nonce from the memory controller 120 as described with reference to FIG.

6. For example, the memory device 110 may compare a result value, obtained by decrypting the nonce received from the memory controller 120 according to the cryptographic algorithm using a decrypt key DEC_KEY, to the physical address of the target area TGT_AREA, in order to determine whether the result value is the same as the physical address of the TGT_AREA.

The decrypt key DEC_KEY is a key for decrypting a nonce generated by the memory controller 120, and the memory controller 120 may transmit the decrypt key DEC_KEY to the memory device 110 before the authentication for the nonce is performed. The memory controller 120 may transmit the decrypt key DEC_KEY to the memory device 110 at the time that the memory system 100 is initialized or at the time that the memory system 100 is reset.

The decrypt key DEC_KEY may be equal to or different from the above-described encrypt key ENC_KEY according to the cryptographic algorithm used to generate a nonce. For example, when the used cryptographic algorithm is a symmetric key algorithm (e.g., HMAC or AES), the decrypt key DEC_KEY is equal to the encrypt key ENC_KEY. On the other hand, when the used cryptographic algorithm is an asymmetric key algorithm (e.g., RSA), the decrypt key DEC_KEY is different from the encrypt key ENC_KEY.

Figure 10:
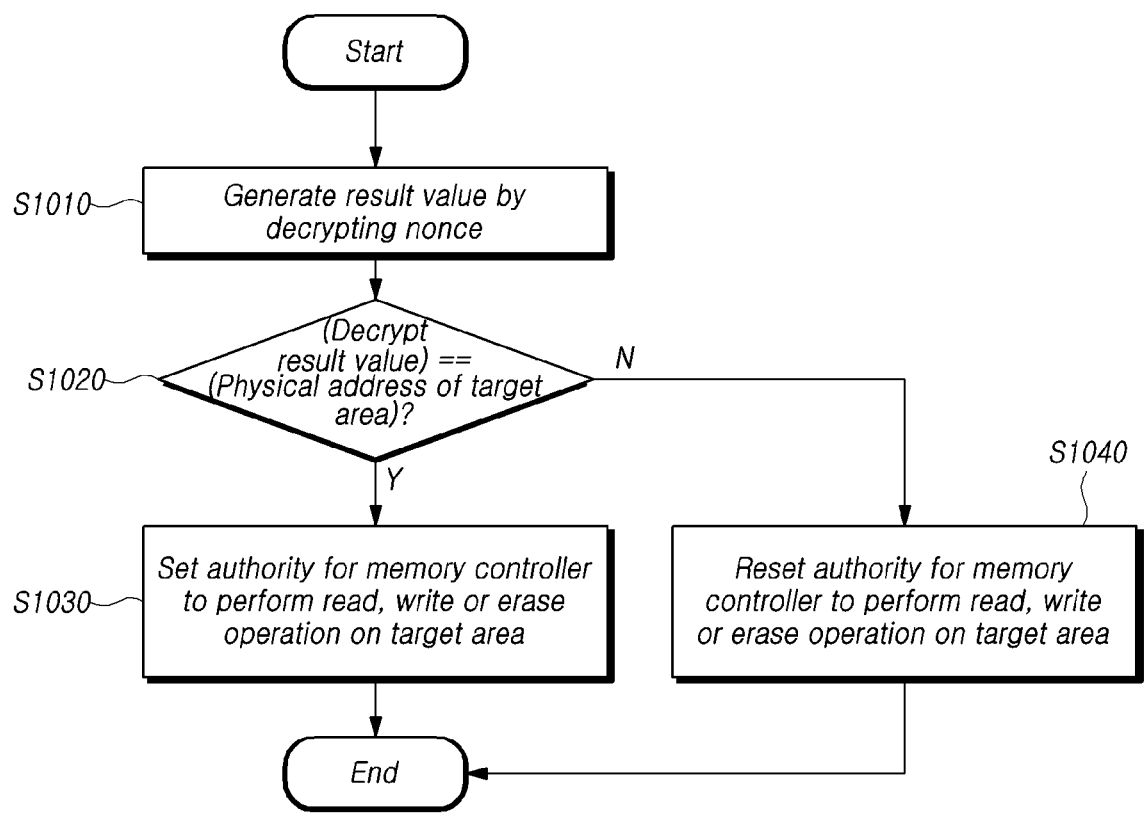
FIG. 10 is a flowchart illustrating the method of FIG. 9.

FIG. 10 is a flowchart illustrating the method of FIG. 9.

Referring to FIG. 10, in operation S1010, the memory device 110 may generate a decrypt result value by decrypting the nonce received from the memory controller 120 with the decrypt key DEC_KEY according to the cryptographic algorithm.

The memory device 110 determines whether the decrypt result value generated in operation S1010 is the same as the physical address of the target area TGT_AREA, which may be provided together with the nonce from the memory controller 120, in operation S1020.

When the descript result value is the same as the physical address of the target area TGT_AREA (Y in operation S1020), the memory device 110 may determine that the authentication for the nonce has succeeded, and set an authority for the memory controller 120 to perform a read, write or erase operation on the target area TGT_AREA, in operation S1030.

On the other hand, when the descript result value is not the same as the physical address of the target area TGT_AREA (N in operation S1020), the memory device 110 may determine that the authentication for the nonce has failed, and reset the authority for the memory controller 120 to perform a read, write or erase operation on the target area TGT_AREA, in operation S1040.

The method described with reference to FIGS. 9 and 10 may be applied when the memory device 110 can perform a decrypt operation according to the cryptographic algorithm.

However, when the memory device 110 is not capable of performing a decrypt operation according to the cryptographic algorithm by itself, the memory device 110 may authenticate a nonce according to another method.

Figure 11:
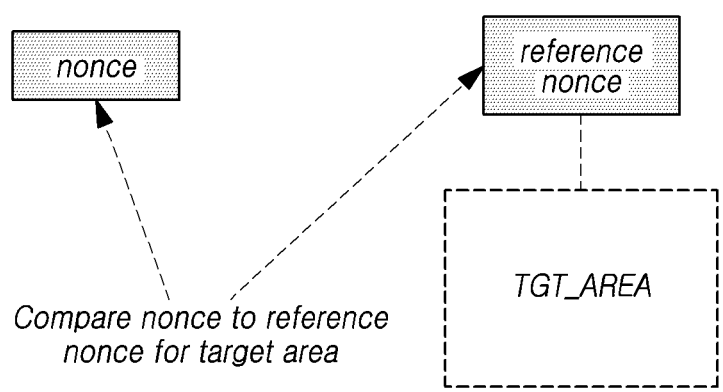
FIG. 11 is a diagram illustrating another example of a method in which a memory device, according to an embodiment of the present disclosure, authenticates a nonce.

FIG. 11 is a diagram illustrating another example of the method in which the memory device 110, according to an embodiment of the present disclosure, authenticates a nonce.

Referring to FIG. 11, the memory device 110 may authenticate a nonce received from the memory controller 120 by comparing the nonce to a reference nonce for the target area TGT_AREA.

The reference nonce for the target area TGT_AREA may be generated by the memory controller 120. The memory controller 120 may transmit, to the memory device 110, a command for setting the reference nonce for the target area TGT_AREA. For example, when transmitting a command for a request for resetting the authority for the memory controller 120 to perform a read, write or erase operation on the target area TGT_AREA, the memory controller 120 may also transmit the reference nonce to the memory device 110.

The reference nonce for the target area TGT_AREA may be reset when the target area TGT_AREA is erased or a command for setting a new reference nonce for the target area TGT_AREA is received from the memory controller 120.

Figure 12:
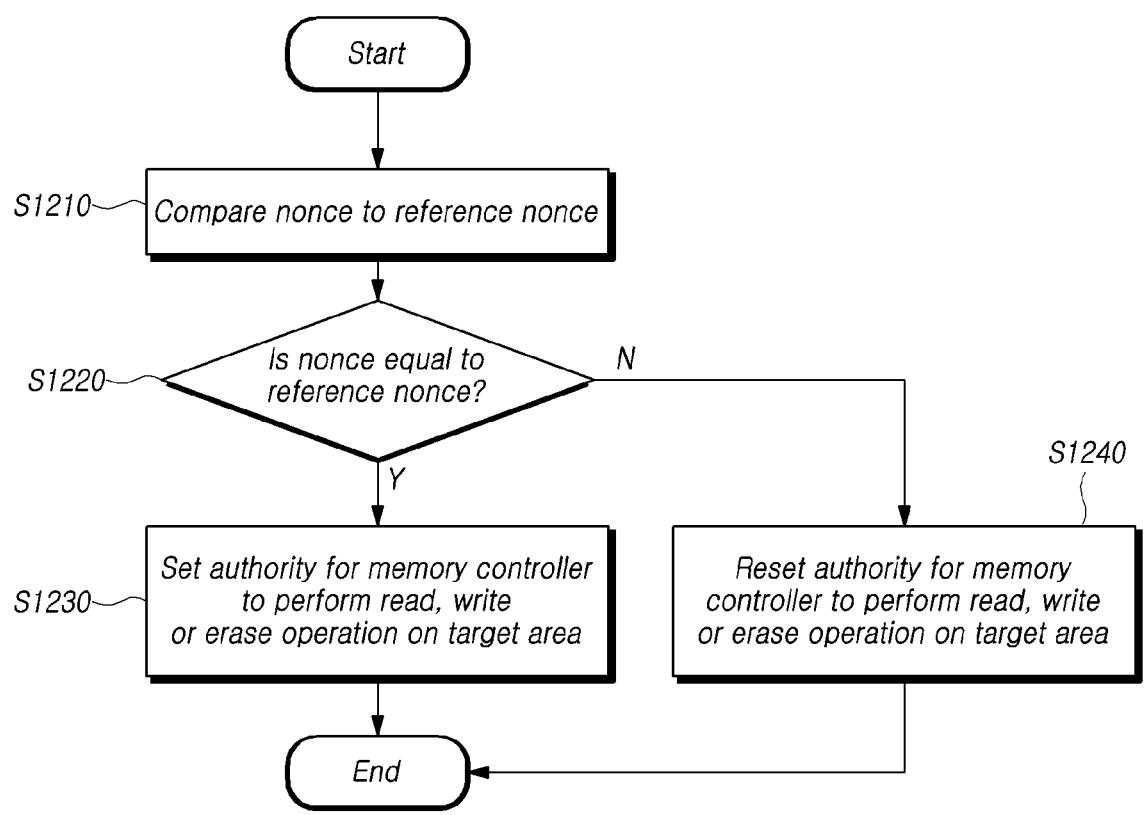
FIG. 12 is a flowchart illustrating the method of FIG. 11.

FIG. 12 is a flowchart illustrating the method of FIG. 11.

Referring to FIG. 12, the memory device 110 may compare the nonce received from the memory controller 120 to the reference nonce for the target area in operation S1210.

The memory device 110 determines whether the nonce received from the memory controller 120 is equal to the reference nonce for the target area, in operation S1220.

When the nonce received from the memory controller 120 is equal to the reference nonce for the target area (Y in operation S1220), the memory device 110 may determine that the authentication for the nonce has succeeded, and set an authority for the memory controller 120 to perform a read, write or erase operation on the target area TGT_AREA, in operation S1230.

On the other hand, when the nonce received from the memory controller 120 is different from the reference nonce for the target area (N in operation S1220), the memory device 110 may determine that the authentication for the nonce has failed, and reset the authority for the memory controller 120 to perform a read, write or erase operation on the target area TGT_AREA, in operation S1240.

Figure 13:
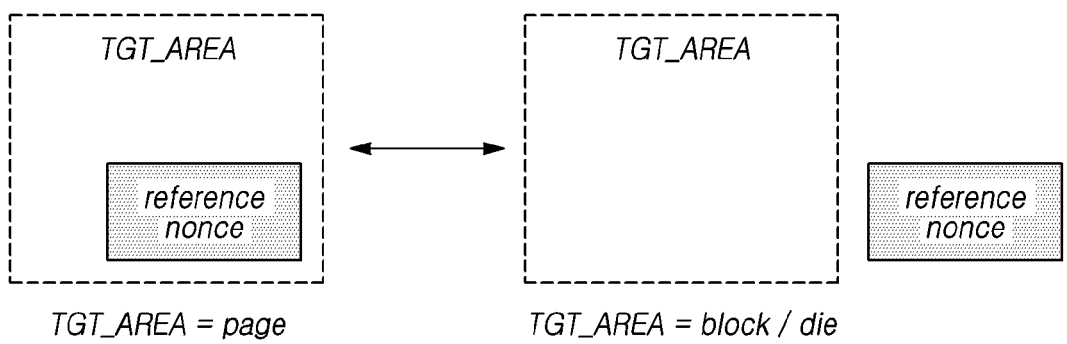
FIG. 13 is a diagram illustrating an example of the location where a reference nonce is stored in the memory device described with reference to FIG. 11.

FIG. 13 is a diagram illustrating an example of the location where the reference nonce is stored in the memory device 110 described with reference to FIG. 11.

The location where the reference nonce for the target area TGT_AREA is stored in the memory device 110 may be decided according to the target area TGT_AREA.

For example, when the target area TGT_AREA is a page, the reference nonce for the target area TGT_AREA may be stored inside of the target area TGT_AREA. On the other hand, when the target area TGT_AREA is a memory block or memory die, the reference nonce for the target area TGT_AREA may be stored outside of the target area TGT_AREA.

Figure 14:
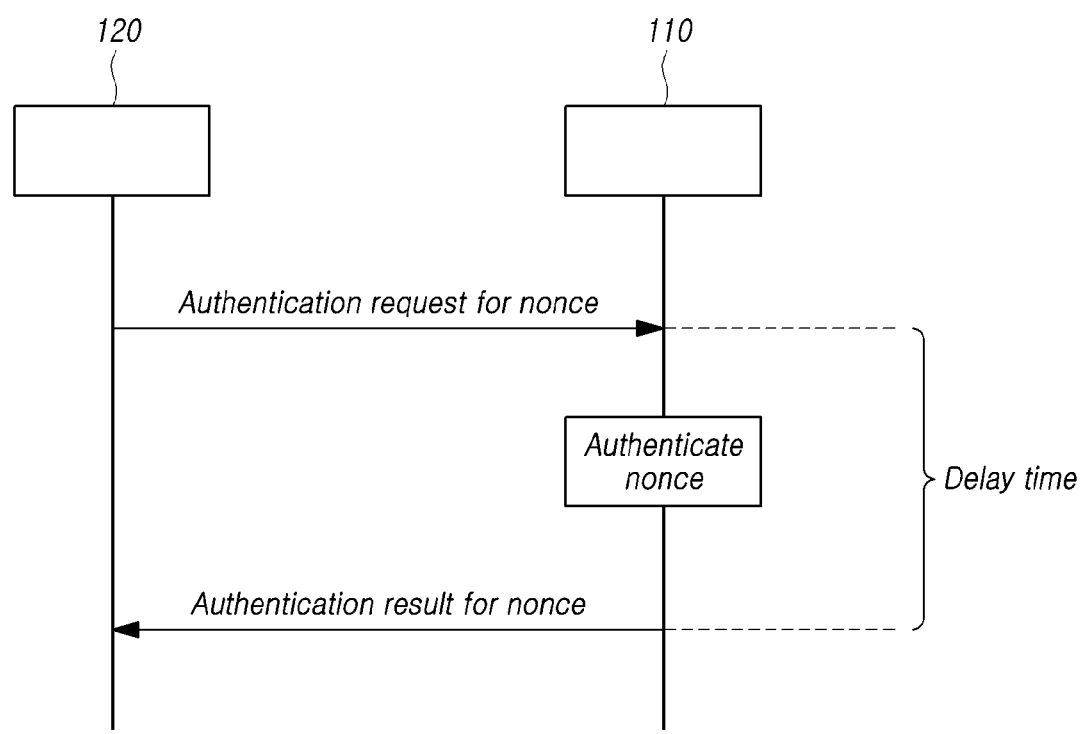
FIG. 14 is a diagram illustrating an example of a time at which a memory device, according to an embodiment of the present disclosure, transmits an authentication result for a nonce to a memory controller.

FIG. 14 is a diagram illustrating an example of a time at which the memory device 110, according to an embodiment of the present disclosure, transmits an authentication result for a nonce to the memory controller 120.

Referring to FIG. 14, the memory controller 120 may transmit an authentication request for a nonce to the memory device 110. The memory device 110 may authenticate the nonce, and transmit the authentication result (success/fail) to the memory controller 120.

The memory device 110 may transmit the authentication result for the nonce to the memory controller 120 after a set delay time. This is to prevent an external attacker from delivering a brute-force attack to the memory device 110.

Figure 15:
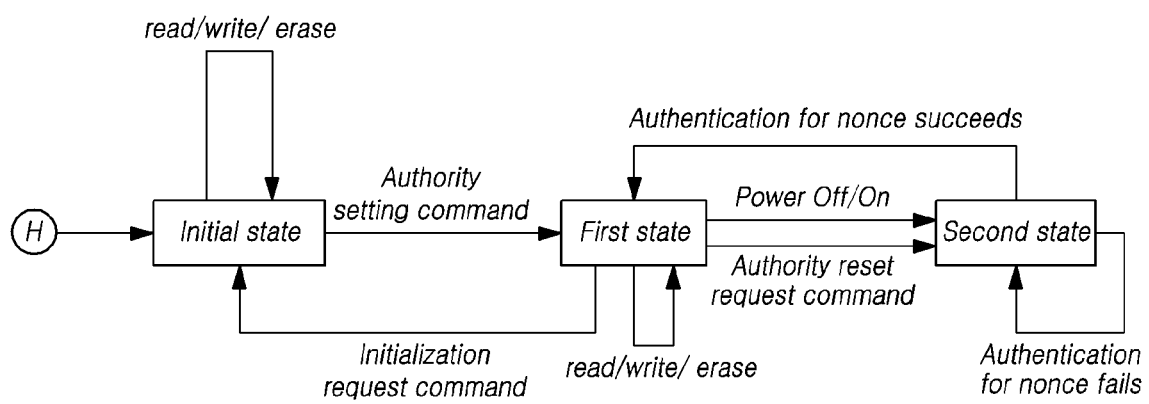
FIG. 15 is a diagram illustrating another example of a state diagram of a memory device according to an embodiment of the present disclosure.

FIG. 15 illustrates another example of a state diagram of the memory device 110 according to an embodiment of the present disclosure.

FIG. 15 is a state diagram of the memory device 110, which is obtained by adding the initial state to FIG. 8.

Referring to FIG. 15, the memory device 110 may enter the initial state when initially booted. The memory device 110 may perform a read, write or erase operation without separate authentication in the initial state. That is because the memory device 110 cannot perform an authentication operation in the initial state, because no nonce or key has been received from the memory controller 120.

When the memory device 110 is in the initial state, the memory device 110 may process a read, write or erase request for the target area, received from the memory controller 120. Even after the request is completely processed, the memory device 110 may remain in the initial state for that target area.

When a command for a request for setting an access authority is received from the memory controller 120 while the memory device 110 is in the initial state, the memory device 110 may transition to the first state in which the authority for the memory controller 120 to perform a read, write or erase operation on the target area TGT_AREA is set. At this time, the memory device 110 may receive, from the memory controller 120, a decrypt key for decrypting the reference nonce or nonce with the command for the request for setting the access authority.

When the memory device 110 is in the first state, the memory device 110 may process a read, write or erase request for the target area, received from the memory controller 120. Even after the request is completely processed, the memory device 110 remains in the first state.

When the memory device 110 is in the first state, the memory device 110 may transition to the second state in which the authority for the memory controller 120 to perform a read, write or erase operation on the target area is reset, when i) a power off/on occurs or ii) a command for a request for resetting the authority to perform a read, write or erase operation on the target area TGT_AREA is received from the memory controller 120.

When the memory device 110 is in the first state, the memory device 110 may transition to the initial state when an initialization request command is received from the memory controller 120.

When the memory device 110 is in the second state, the memory device 110 may transition to the first state when the authentication for the nonce received from the memory controller 120 succeeds.

When the memory device 110 is in the second state, the memory device 110 may remain in the second state when the authentication for the nonce received from the memory controller 120 fails.

Figure 16:
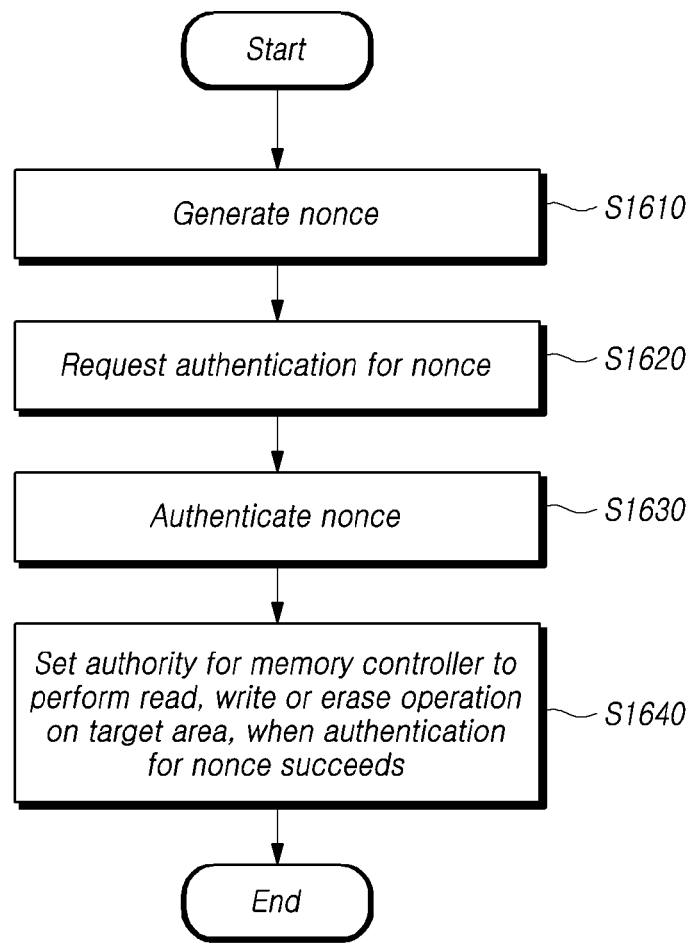
FIG. 16 is a flowchart illustrating an operating method of a memory system according to an embodiment of the present disclosure.

FIG. 16 is a flowchart illustrating an operating method of the memory system 100 according to an embodiment of the present disclosure.

The operating method of the memory system 100 may include generating, by the memory controller 120, a nonce based on the physical address of a target area of the memory device 110 according to a cryptographic algorithm (S1610).

The target area may be a page, memory block or memory die. The cryptographic algorithm may be one of HMAC, SHA, AES and RSA, for example.

The operating method of the memory system 100 may include requesting, by the memory controller 120, authentication for the generated nonce (S1620).

The operating method of the memory system 100 may include authenticating the nonce by the memory device 110 (S1630).

In operation S1630, for example, the memory device 110 may authenticate the nonce by decrypting the nonce to generate a result value and then by comparing the result value with the physical address of the target area, which is provided together with the nonce from the memory controller 120.

In operation S1630, for another example, the memory device 110 may authenticate the nonce by comparing the nonce to the value of a reference nonce for the target area. The reference nonce may be stored in the target area.

The operating method of the memory system 100 may include setting, by the memory device 110, an authority for the memory controller 120 to perform a read, write or erase operation on the target area, when the authentication for the nonce succeeds (S1640).

The authority to perform a read, write or erase operation on the target area may be reset when i) a power off/on occurs or ii) a command for a request for resetting the authority for the memory controller 120 to perform a read, write or erase operation on the target area is transmitted to the memory device 110.

The authentication result for the nonce may be transmitted to the memory controller 120 by the memory device 110 after a set delay time.

The above-described operation of the memory controller 120 may be controlled by the control circuit 123, and performed according to a method in which the processor 124 executes (drives) firmware in which operations of the memory controller 120 are performed.

Figure 17:
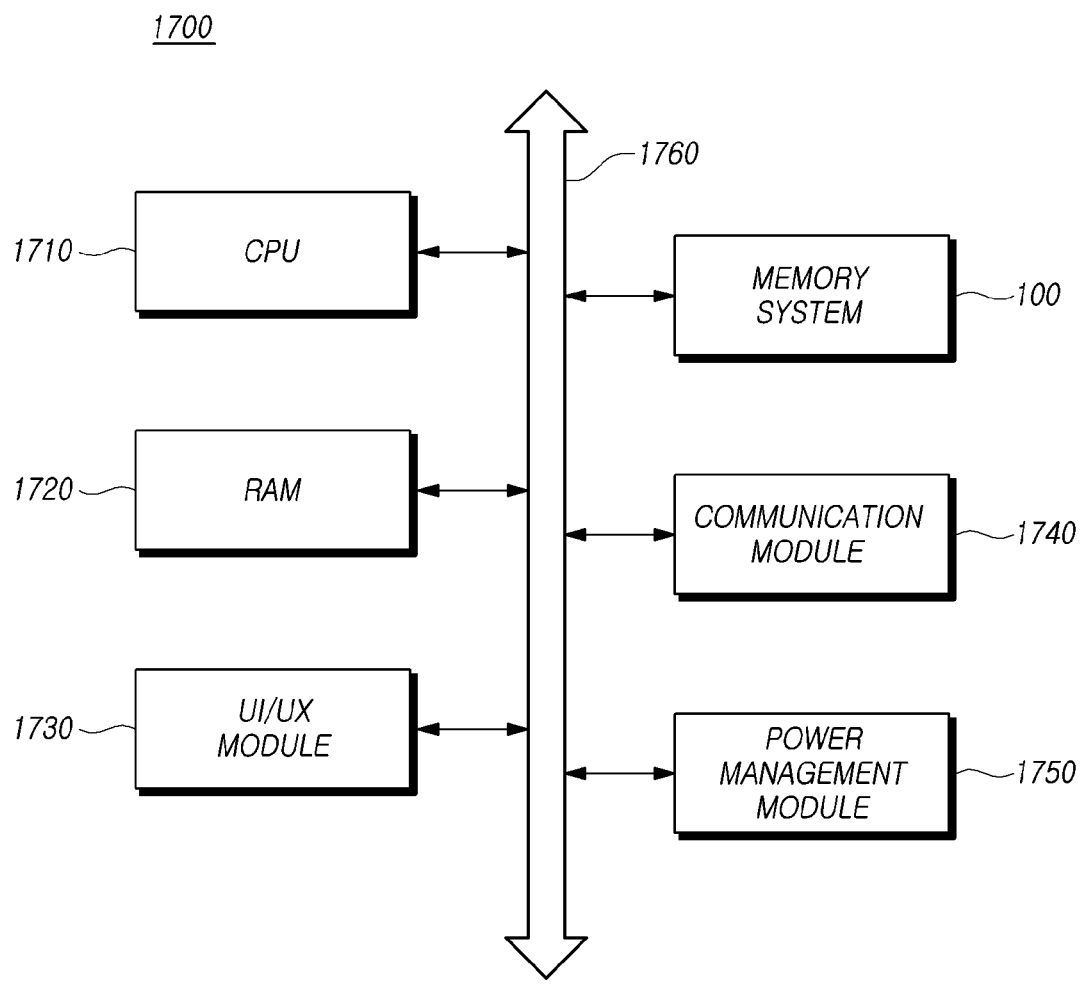
FIG. 17 is a diagram illustrating a configuration of a computing system according to embodiments of the present disclosure.

FIG. 17 is a diagram illustrating a configuration of a computing system 1700 according to an embodiment of the present disclosure.

Referring to FIG. 17, the computing system 1700 may include: a memory system 100 electrically connected to a system bus 1760; a CPU 1710 configured to control overall operation of the computing system 1700; a RAM 1720 configured to store data and information related to operations of the computing system 1700; a user interface/user experience (UI/UX) module 1730 configured to provide the user with a user environment; a communication module 1740 configured to communicate with an external device in a wired and/or wireless manner; and a power management module 1750 configured to manage power used by the computing system 1700.

The computing system 1700 may be a personal computer (PC) or may include a mobile terminal such as a smartphone, a tablet or any of various other electronic devices.

The computing system 1700 may further include a battery for supplying an operating voltage, and may further include an application chipset, a graphic-related module, a camera image processor, and a DRAM. Additional elements may be included as those skilled in the art understand.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of various types of storage devices, any of which may be mounted or embedded in any of various electronic devices.

According to embodiments of the present invention disclosure described above, the operation delay time of the memory system may be reduced or minimized. In addition, according to an embodiment of the present invention disclosure, overhead occurring in the process of calling a specific function may be reduced or minimized. Although various embodiments of the present invention disclosure have been illustrated and described, those skilled in the art will appreciate that various modifications, additions and substitutions are possible, without departing from the scope and spirit of the invention as set forth in the accompanying claims. That is, embodiments of the present invention disclosure have been described for the sake of brevity and clarity, not to limit the invention. The scope of the present invention encompasses all variations that fall within the scope of the claims including their equivalents.

What is claimed is:

1. A memory system comprising:
a memory device comprising a plurality of memory dies, each including a plurality of memory blocks, each including a plurality of pages having data stored therein; and
a memory controller suitable for communicating with the memory device and executing firmware to control the memory device,
wherein the memory controller generates a nonce based on a physical address of a target area of the memory device using a cryptographic algorithm and requests the memory device to authenticate the nonce,
wherein the memory device sets an authority for the memory controller to perform a read, write or erase operation on the target area when the authentication for the nonce succeeds, and
wherein the memory controller encrypts the physical address of the target area according to the cryptographic algorithm in order to generate the nonce.

2. The memory system of claim 1, wherein the target area is a page, memory block or memory die.

3. The memory system of claim 1, wherein the cryptographic algorithm is one of HMAC, SHA, AES and RSA.

4. The memory system of claim 1, wherein the memory device resets the authority for the memory controller to perform a read, write or erase operation on the target area when i) a power off/on occurs or ii) a command for a request for resetting the authority to perform a read, write or erase operation on the target area is received from the memory controller.

5. The memory system of claim 1, wherein the memory device is further suitable for authenticating the nonce by comparing a result value, which is generated by decrypting the nonce using the cryptographic algorithm, to the physical address of the target area.

6. The memory system of claim 5, wherein the memory controller transmits a decrypt key for decrypting the nonce to the memory device before the authentication for the nonce is performed.

7. The memory system of claim 1, wherein the memory device authenticates the nonce by comparing the nonce to a reference nonce for the target area.

8. The memory system of claim 7, wherein the reference nonce is stored in the target area when transmitting a command for a request for resetting the authority for the memory controller.

9. The memory system of claim 1, wherein the memory device transmits a result of the authentication to the memory controller after a set delay time.

10. An operating method of a memory system which includes a memory device including a plurality of memory dies, each including a plurality of memory blocks, each including a plurality of pages having data stored therein; and a memory controller suitable for communicating with the memory device and executing firmware to control the memory device, the operating method comprising:
generating, by the memory controller, a nonce based on a physical address of a target area of the memory device using a cryptographic algorithm;
requesting, by the memory controller, authentication for the nonce;
authenticating the nonce by the memory device; and
setting, by the memory device, an authority for the memory controller to perform a read, write or erase operation on the target area when the authentication for the nonce succeeds,
wherein the physical address of the target area is encrypted, by the memory controller, according to the cryptographic algorithm in order to generate the nonce.

11. The operating method of claim 10, wherein the target area is a page, memory block or memory die.

12. The operating method of claim 10, wherein the cryptographic algorithm is one of HMAC, SHA, AES and RSA.

13. The operating method of claim 10, further comprising resetting, by the memory device, the authority to perform a read, write or erase operation on the target area when i) a power off/on occurs or ii) the memory controller transmits, to the memory device, a command for a request for resetting the authority to perform a read, write or erase operation on the target area.

14. The operating method of claim 10, wherein the nonce is authenticated by comparing a result value, which is generated by decrypting the nonce using the cryptographic algorithm, to the physical address of the target area.

15. The operating method of claim 14, further comprising transmitting a decrypt key for decrypting the nonce to the memory device before the authenticating is performed.

16. The operating method of claim 10, wherein the nonce is authenticated by comparing the nonce to a reference nonce for the target area.

17. The operating method of claim 16, wherein the reference nonce is stored in the target area when transmitting a command for a request for resetting the authority for the memory controller.

18. The operating method of claim 10, further comprising transmitting, by the memory device, a result of the authenticating to the memory controller after a set delay time.

* * * * *